United States Patent [19]
Kiefer

[11] Patent Number: 5,588,684
[45] Date of Patent: Dec. 31, 1996

[54] NON-ROTATABLE MECHANICAL ATTACHMENT AND METHOD THEREFOR

[75] Inventor: James Kiefer, Grand Rapids, Mich.

[73] Assignee: RAN Enterprises, Inc., Grand Rapids, Mich.

[21] Appl. No.: 449,094

[22] Filed: May 24, 1995

[51] Int. Cl.$^6$ ..................................................... F16L 3/00
[52] U.S. Cl. ........................... 285/62; 285/222; 285/330; 116/137 R; 29/512; 29/521
[58] Field of Search ................................. 285/334.5, 330, 285/382.4, 222, 62; 116/137 R; 29/512, 521

[56] References Cited

U.S. PATENT DOCUMENTS

| | | |
|---|---|---|
| 405,227 | 6/1889 | Schaubel . |
| 911,397 | 2/1909 | Howell . |
| 928,947 | 7/1909 | Dawson . |
| 949,621 | 2/1910 | Coleman . |
| 1,340,118 | 5/1920 | Coleman . |
| 1,884,602 | 10/1932 | Dillhoefer ..................... 285/330 X |
| 2,729,188 | 1/1956 | Erikson ........................ 285/131 X |
| 4,905,766 | 3/1990 | Dietz et al. . |

FOREIGN PATENT DOCUMENTS

| | | | |
|---|---|---|---|
| 5141580 | 6/1993 | Japan ....................................... | 285/330 |
| 2066400 | 7/1981 | United Kingdom .................... | 285/330 |

OTHER PUBLICATIONS

Exhibit A discloses a prior art three-piece horn assembly disclosed in the background of the present specification, the horn assembly being manufactured by Hadley Products, Grandville, Michigan.

Primary Examiner—Dave W. Arola
Attorney, Agent, or Firm—Price, Heneveld, Cooper, DeWitt & Litton

[57] ABSTRACT

A three-piece air horn assembly is provided including a die cast base configured for attachment to a vehicle, an intermediate tube, and a die cast bell, which pieces are interconnected by mechanical connections. In particular, the base includes a cylindrically-shaped hole with front and rear shoulders at each end, the rear shoulder being circumferentially non-uniform, and the tube includes a circumferentially extending ridge engaging the front shoulder and a flared end engaging the rear shoulder. The tube is extended into the hole in the base and the end is then flared into engagement with the non-uniform rear shoulder. Engagement of the flared end into the non-uniform rear shoulder prevents rotation of the tube on the base while the engagement of the flared end and the ridge with the front and rear shoulders, respectively, provides an axially secure connection. The intermediate tube is similarly connected to the bell by an all mechanical connection including a second ridge engaging a front shoulder on the bell and a second flared end engaging a rear shoulder on the bell.

20 Claims, 3 Drawing Sheets

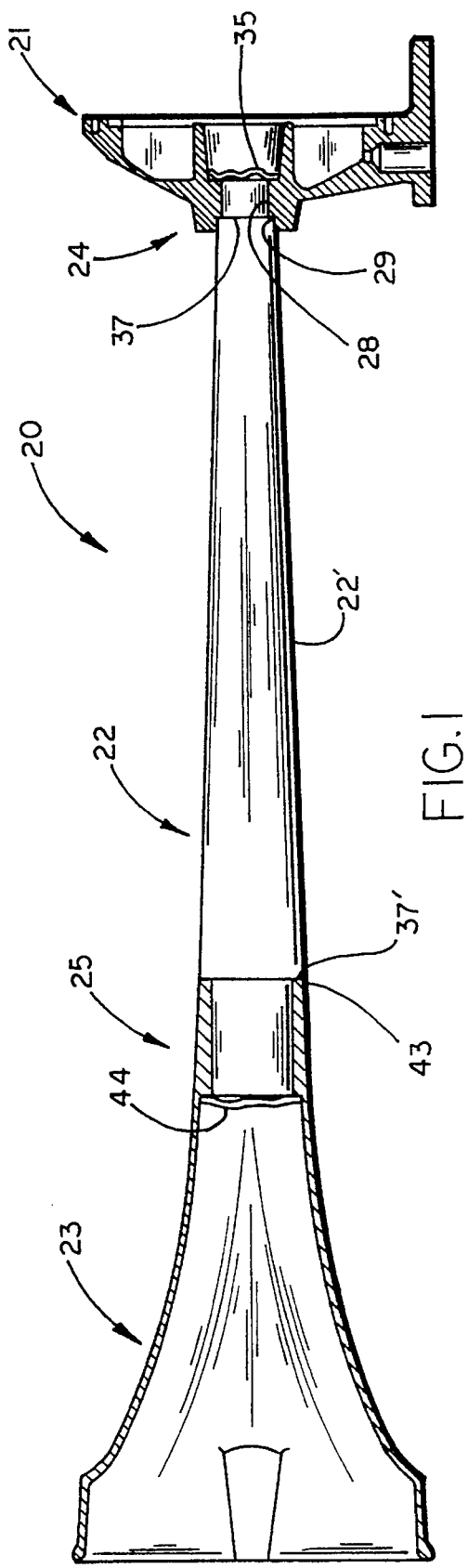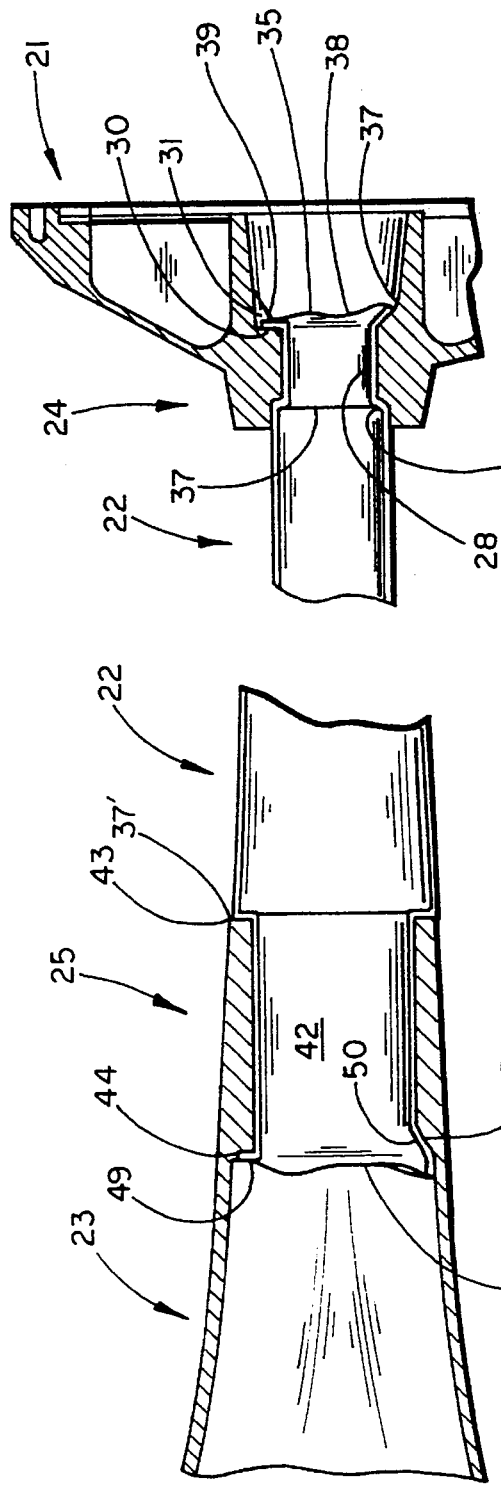

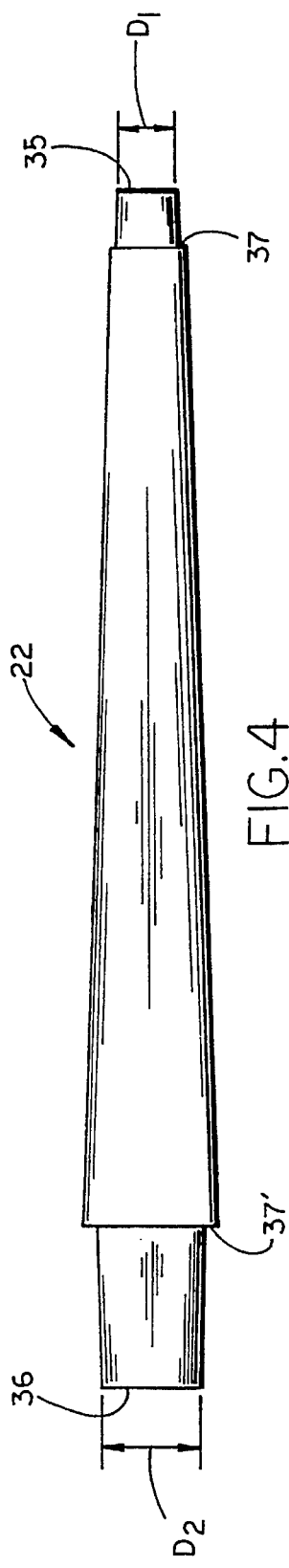
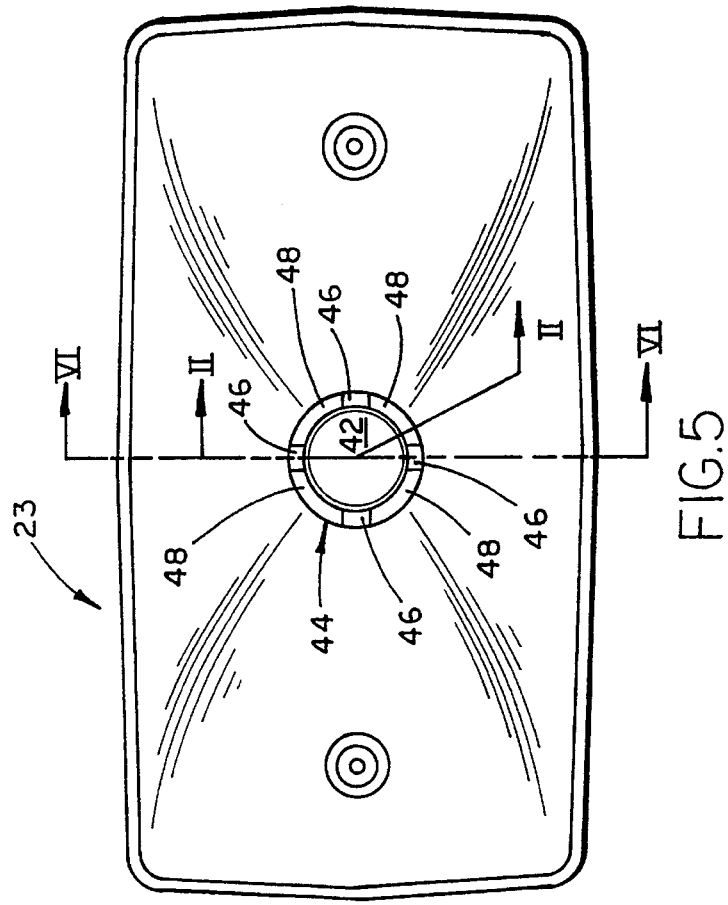
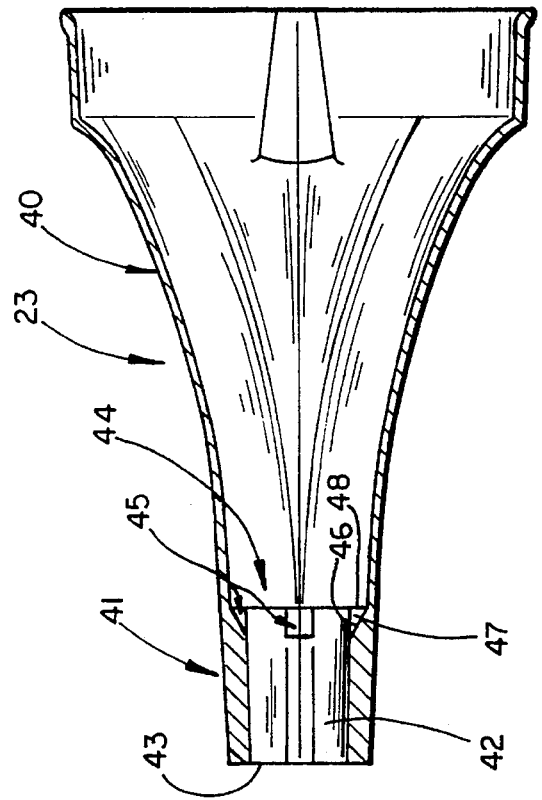

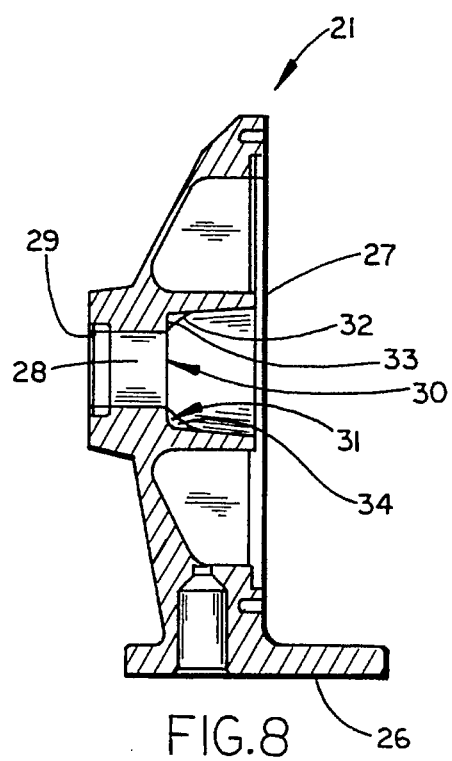
FIG. 8
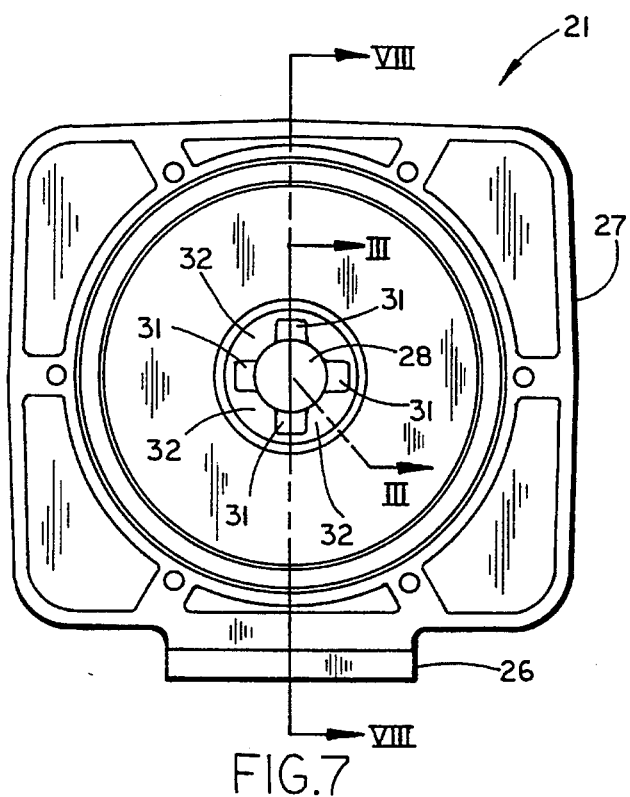
FIG. 7
```
┌─────────────────────┐
│ POSITION TUBE IN    │
│ RECEIVING STRUCTURE │
└──────────┬──────────┘
           ↓
┌─────────────────────┐
│ MECHANICALLY SECURE │
│ BY FLARING END OF   │
│ TUBE OUTWARDLY      │
└─────────────────────┘
```
FIG. 9
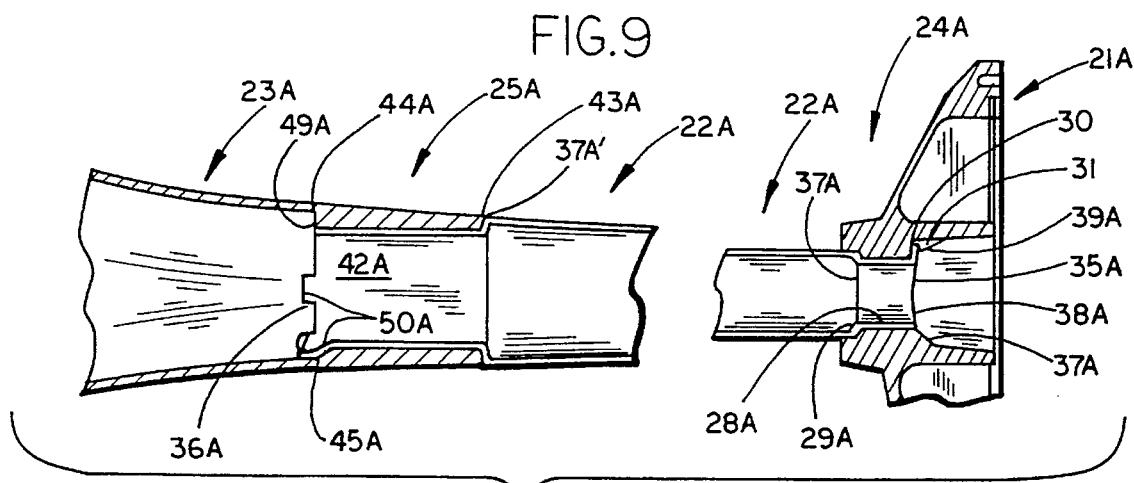
FIG. 10

NON-ROTATABLE MECHANICAL ATTACHMENT AND METHOD THEREFOR

BACKGROUND OF THE INVENTION

The present invention concerns a mechanical connection of a tube to a tube receiving member, and more particularly, concerns a multi-piece air horn that includes mechanical connections facilitating assembly while also providing a non-rotatable, axially secure arrangement, although the invention is not limited to air horns.

Air horns positioned on truck cabs must withstand substantial vibration and stress without failure. Multi-piece air horns are desirable since individual parts can be tuned to provide optimal sound characteristics while minimizing part costs. However, the connections joining the multiple pieces must be secure and durable since the failure of any of the connections can cause one of the multiple pieces to come loose, causing a safety hazard.

In a known three-piece air horn, a die cast base and a die cast bell are attached to opposing ends of a welded steel tube of gradually increasing diameter. The narrow end of the tube includes a knurled exterior surface for mateably engaging a mating hole in the die cast base and further includes an end surface that abuttingly engages a shoulder in the hole to set the depth of the robe in the base. The knurled outer surface is coated with adhesive which fills any gaps in the connection and holds the tube and base together when it cures. The larger end of the robe also fits mateably into a hole in the bell, and is also secured therein by cured adhesive. However, the adhesive sometimes does not withstand the substantial vibration and stress encountered by an air horn in the field such that the connection does not hold, and the parts come apart. Still further, adhesive is expensive and its application labor intensive since it requires an additional step in the assembly process, and still further requires cure time to set the adhesive. Also, knurling the steel tube is not inexpensive.

Thus, a mechanical connection solving the aforementioned problems is desired. Further, a mechanical connection is desired which provides a secure, non-rotatable connection that securely holds parts without the need for secondary operations.

SUMMARY OF THE INVENTION

The present invention includes a mechanical connection having a first member with receiving structure defining a cylindrically-shaped hole and first and second laterally extending shoulders at opposite ends of the hole. A tubular member includes an end section shaped to mateably engage the cylindrically-shaped hole. The end section includes a ring-shaped ridge for engaging the first shoulder and a flared end that is flared after insertion of the end section into the cylindrically-shaped hole for engaging the second shoulder. The second laterally extending shoulder is ring-shaped but circumferentially non-uniform. The flared end includes material engaging the non-uniform second shoulder that prevents rotation of the tubular member relative to the first member. By this arrangement, the first member and the tubular member are fixedly mechanically connected both axially and non-rotatably by engagement of the first shoulder and ridge and also by engagement of the second shoulder and the flared end.

These and other features, advantages, and objects of the present invention will be further understood and appreciated by those skilled in the art by reference to the following specification, claims, and appended drawings.

BRIEF DESCRIPTION OF THE DRAWINGS

FIG. 1 is a side view, partially in cross section, of an air horn assembly embodying the present invention;

FIG. 2 is an enlarged, cross-sectional view of the mechanical interconnection of the bell-shaped end with the intermediate tube, the cross section being taken with respect to the bell-shaped member along the lines II—II in FIG. 5;

FIG. 3 is an enlarged cross-sectional view of the mechanical connection of the intermediate tube to the base of the horn assembly, the cross section being taken with respect to the base along the lines III—III in FIG. 7;

FIG. 4 is a side view of the intermediate tube;

FIG. 5 is an end view of the bell-shaped end;

FIG. 6 is a cross-sectional view of the bell-shaped end taken along the lines VI—VI in FIG. 5;

FIG. 7 is a plan view of the base shown in FIG. 1;

FIG. 8 is a cross-sectional view taken along the lines VIII—VIII in FIG. 7;

FIG. 9 is a flow chart showing the assembly of the intermediate tube to the base and/or the bell-shaped end; and FIG. 10 is a cross-sectional view of a modified air horn assembly embodying the present invention.

DETAILED DESCRIPTION OF PREFERRED EMBODIMENT

A three-piece air horn assembly 20 (FIG. 1) embodying the present invention is provided including a die cast base 21 configured for attachment to a vehicle, an intermediate tube 22, and a die cast bell 23, which pieces are interconnected solely by mechanical connections 24 and 25. The two components forming each mechanical connection (i.e. base 21 and tube 22, or tube 22 and bell 23) include mating cylindrically-shaped surfaces that allow them to be assembled without regard to their rotational orientation. After assembly, a flange is formed on a protruding end of the tube 22. The flange includes material that engages depressions in the mating component to prevent relative rotation of the two components. The flange cooperates with a ridge on the tube 22 to provide a secure connection (24 and 25) that cannot be axially separated. Thus, the tube 22 is retained in the mating component axially and rotationally. Notably, the anti-rotational feature prevents the tube 22 from rotating in the mating component, which would tend to loosen the connection over time.

More particularly, the base 21 (FIGS. 7–8) includes a mounting flange 26 adapted for connection to a vehicle, and a support-and-resonating main section 27. A cylindrically-shaped hole 28 is formed in main section 27, and shoulders 29 and 30 are defined at opposing ends of hole 28. Shoulder 29 is ring-shaped and is recessed into main section 27 slightly. Shoulder 30 is ring-shaped and includes radiating depressions 31 (FIG. 7) such that it is circumferentially non-uniform. Depressions 31 are defined between inclined surfaces 32 (FIG. 8) that extend at an angle radially from hole 28 toward the back of base 21. Specifically, depressions 31 are defined by the orthogonal surfaces 33 on shoulder 30, and by longitudinally extending side surfaces 34.

Tube 22 (FIG. 4) is an elongated member with a frusto-conically-shaped mid-section 22' having walls made from low carbon, thin wall steel tube material. Tube 22 in its present form will typically be made from SAE 1008/10 AKDQ, 1.50" O.D. 20 GA wall tubing. Tube 22 includes a first end 35 having a first diameter D1 for engaging base 21, and a second end 36 having a second diameter D2 for engaging bell 23. Diameter D1 is smaller than diameter D2, and the change in diameter from end 35 to end 36 is gradual for optimal acoustics. For example, in a known air horn assembly, the tube varies from about 75 inches at one end to 1.32 inches at the other end for optimal acoustics. A first ridge 37 extends circumferentially around tube 22 at a location spaced from end 35, and a second ridge 37' extends circumferentially around tube 22 at a second location spaced from end 36.

The end 35 (FIG. 1) of tube 22 is extended into hole 28 until ridge 37 engages shoulder 29. A rotating tool (not specifically shown) including opposing and rotatable forming wheels deforms end 35 outwardly into engagement with shoulder 30. The flange 38 (FIG. 3) formed thereby is continuous and undulating, and includes sections of material 39 that engage depressions 31. Flange material 39 prevents rotation of tube 22 in base 21, and thus prevent undesirable rotational movement that would cause tube 22 to work loose from base 21 over time. Flange 38 also combines with ridge 37 to lock the tube 22 axially onto base 21 by engaging shoulders 29 and 30, respectively. It is contemplated that flange 39 does not need to be continuous, but rather can include tabs not unlike flange material 39 that engage depressions 31 to retain tube 22 on base 21.

Bell 23 (FIGS. 5–6) is die cast and includes a trumpet-like or horn section 40 for directing sound vibration forwardly from bell 23 and further includes a tube-engaging section 41. Tube-engaging section 41 defines a hole 42 having shoulders 43 and 44 at opposing ends. Shoulder 43 is similar to shoulder 29 on base 21, and shoulder 44 is similar to shoulder 30, except that the hole 42 and shoulders 43 and 44 are larger. Specifically, shoulder 43 is ring-shaped and is recessed into tube-engaging section 41 slightly. Shoulder 44 is ring-shaped and includes radiating depressions 45 such that it is circumferentially non-uniform. The bottom of depressions 45 are defined by inclined surfaces 46 that extend at an angle and radially from hole 42 toward the sound emitting end of bell 23. The sides of depressions 45 are defined by longitudinally extending side surfaces 47. The remainder of shoulder 43 is defined by radial circumferentially extending surface 48.

The end 36 (FIG. 2) of tube 22 is extended into hole 42 until ridge 37' engages shoulder 43. A wedge-shaped tool (not specifically shown) having angled surfaces is extended to engagement with the end of tube 22 so that it deforms end 36 outwardly into engagement with second shoulder 44. The flange 49 formed thereby is continuous and undulating, and includes sections of material 50 that engage depressions 45. Flange material 50 prevents rotation of tube 22 in bell 23, and thus prevents undesirable rotational movement that would cause tube 22 to work loose from bell 23 over time. Flange 49 also combines with ridge 37' to engage shoulders 43 and 44, thus locking tube 22 axially onto bell 23.

It is contemplated that flange 49 does not need to be continuous, but rather can be discontinuous. For example, a modified horn assembly 20A (FIG. 10) embodying the present invention includes a base 21A, an intermediate tube 22A, and a bell 23A. In horn assembly 20A, all features and parts identical or comparable to horn assembly 20 are identified using identical numbers, but with the addition of the letter "A" thereto. In horn assembly 20A, tabs 39A engage depressions 31A in base 21A, and tabs 50A engage depressions 45A in bell 23A.

Thus, a multi-piece horn is provided having components that are interconnectable without regard to radial orientation, and that is interconnected only by mechanical connection. Thus, the horn can be made from relatively low cost parts and relatively low cost assembly operations.

In the foregoing description, it will be readily appreciated by those skilled in the art that modifications may be made to the invention without departing frown the concepts disclosed herein. Such modifications are to be considered as included in the following claims, unless these claims by their language expressly state otherwise.

The embodiments of the invention in which an exclusive property or privilege is claimed are defined as follows:

1. A mechanical connection comprising:

a first member including receiving structure defining a generally cylindrically-shaped hole with a longitudinal axis and first and second laterally extending shoulders located at opposite ends of the hole;

a tubular member having an end section shaped to mateably engage the cylindrically-shaped hole, said end section including a flared end and a circumferentially extending ridge spaced from said flared end, said ridge and said flared end engaging said first and second laterally extending shoulders, respectively;

said first laterally extending shoulder being circumferentially uniform so that the tubular member can be extended into the hole and the ridge engaged with the first shoulder without regard to angular orientation of the tubular member relative to the first member; and said second laterally extending shoulder being ring-shaped but including radially-extending depressions and being circumferentially non-uniform, said flared end including material flared after engagement of the end section with the hole that engages said non-uniform second shoulder to prevent rotation of said tubular member relative to said first member, whereby said first member and said tubular member are fixedly mechanically connected both axially and non-rotatably by engagement of said first shoulder and said ridge, and by interlocking engagement of said second shoulder and said flared end.

2. A mechanical connection as defined in claim 1 wherein said first member comprises a die cast part.

3. A mechanical connection as defined in claim 2 wherein said tubular member is generally frustoconically-shaped.

4. A mechanical connection as defined in claim 2 including a second member having second receiving structure defining a second generally cylindrically-shaped hole with a longitudinal axis and third and fourth laterally extending shoulders located at opposite ends of the hole, said fourth shoulder being circumferentially non-uniform, said tubular member having a second end section shaped to mateably engage said second cylindrically-shaped hole, said second end section including a second flared end and a second circumferentially extending second ridge spaced from said second flared end, said second ridge and said second flared end engaging said third and fourth laterally extending shoulders, respectively.

5. A mechanical connection as defined in claim 4 wherein said second member comprises a die cast part.

6. A mechanical connection as defined in claim 1 wherein said depressions include an inclined surface extending from said hole to said second shoulder.

7. A mechanical connection as defined in claim 1 wherein said non-uniform second shoulder includes depressions and said flared end includes tabs for engaging said depressions.

8. A mechanical connection as defined in claim 1 wherein said non-uniform second shoulder includes depressions and said flared end includes a continuous undulating flange with sections engaging said depressions.

9. A horn assembly including a mechanical connection as defined in claim 1.

10. A horn assembly as defined in claim 9 wherein said first member comprises a base for said horn assembly.

11. A horn assembly as defined in claim 9 wherein said first member comprises a bell for said horn assembly.

12. A horn assembly comprising:

a base configured for connection to a vehicle;

an intermediate tube connected to said base;

a bell connected to said intermediate tube; and said intermediate tube being connected to one of said base and said bell by a mechanical connection comprising:

said one of said base and bell including a cylindrically-shaped hole and further including first and second lateral extending shoulders located at opposite ends of said hole, said second shoulder including depressions forming a circumferentially non-uniform surface; and said intermediate tube including an end section configured to mateably engage said hole, said end section including a ridge for engaging said first shoulder and a flared end for engaging said second shoulder including said depressions to non-rotatably and axially secure said intermediate tube to said one of said base and said bell.

13. A horn assembly as defined in claim 12 wherein both said base and said bell are mechanically connected to said intermediate tube by one of said mechanical connections.

14. A horn assembly as defined in claim 12 wherein said flared end includes a continuous undulating flange for engaging said depressions and said second shoulder.

15. A horn assembly as defined in claim 12 wherein said base comprises die cast material.

16. A horn assembly as defined in claim 12 wherein said bell comprises die cast material.

17. A horn assembly as defined in claim 12 wherein the engagement of said first shoulder with said ridge and said second shoulder with said flared end comprises the sole means for securing said intermediate tube to said one of said base and bell.

18. A horn assembly for vehicles comprising:

a die cast metal base configured for connection to a vehicle; and a metal tube connected to said base by a mechanical connection, said mechanical connection comprising:

said base including a hole and first and second laterally extending shoulders located at opposite ends of said hole; and said tube including an end section configured to mateably engage said hole, said end section including a first circumferentially extending surface engaging said first shoulder and a flared end engaging said second shoulder to secure said tube to said base non-rotatably and axially, said second shoulder including radially-extending depressions and said flared end including an undulating flange engaging said depressions.

19. A horn assembly for vehicles comprising:

a base having a front side, a rear side, and a hole extending between the front and rear sides;

a tube having an end section configured to fit mateably into the hole, a ridge shaped to engage the first side of the base to limit movement of the end section into the hole but the ridge being uniformly shaped to not require a particular angular orientation of the tube relative to the base to thus facilitate assembly, and a flared end for engaging the rear side; and the rear side including radially-extending depressions, and the flared end including undulations engaging the depressions, whereby the ridge and flared end engage the front and rear sides, respectively, to prevent axial movement of the tube in the base after assembly, and the undulations engage the depressions to prevent rotational movement after assembly, thereby providing a fixed and secure mechanical connection.

20. A horn assembly as defined in claim 19 wherein the mechanical connection is characterized by the flared end, the ridge, and the front and rear sides being the sole connecting structure.

* * * * *

UNITED STATES PATENT AND TRADEMARK OFFICE
CERTIFICATE OF CORRECTION

PATENT NO. : 5,588,684
DATED : December 31, 1996
INVENTOR(S) : Kiefer

It is certified that error appears in the above-indentified patent and that said Letters Patent is hereby corrected as shown below:

Column 1, line 26;

"robe" should be --tube--.

Column 1, line 29;

"robe" should be --tube--.

Column 3, line 5;

"75" should be --.75--.

Column 4, line 6;

"frown" should be --from--.

Signed and Sealed this

Seventeenth Day of June, 1997

*Attest:*

BRUCE LEHMAN

*Attesting Officer*     *Commissioner of Patents and Trademarks*